United States Patent
Gue et al.

(10) Patent No.: US 9,193,524 B2
(45) Date of Patent: Nov. 24, 2015

(54) AUTOMATED ITEM SEQUENCING IN A HIGH-DENSITY GRID-BASED MATERIAL HANDLING SYSTEM

(71) Applicant: Auburn University, Auburn, AL (US)

(72) Inventors: Kevin Gue, Auburn, AL (US); Onur Uludag, Auburn, AL (US)

(73) Assignee: Auburn University, Auburn, AL (US)

( * ) Notice: Subject to any disclaimer, the term of this patent is extended or adjusted under 35 U.S.C. 154(b) by 68 days.

(21) Appl. No.: 14/079,292

(22) Filed: Nov. 13, 2013

(65) Prior Publication Data

US 2014/0135976 A1 May 15, 2014

Related U.S. Application Data

(60) Provisional application No. 61/726,306, filed on Nov. 14, 2012, provisional application No. 61/734,603, filed on Dec. 7, 2012, provisional application No. 61/888,332, filed on Oct. 8, 2013.

(51) Int. Cl.
*G06F 7/00* (2006.01)
*B65G 1/137* (2006.01)
*G06Q 10/08* (2012.01)

(52) U.S. Cl.
CPC ............ *B65G 1/1378* (2013.01); *G06Q 10/087* (2013.01)

(58) Field of Classification Search
USPC .......................................................... 700/214
See application file for complete search history.

(56) References Cited

U.S. PATENT DOCUMENTS

| | | | | |
|---|---|---|---|---|
| 6,694,220 | B1 * | 2/2004 | Tanz | 700/226 |
| 8,612,050 | B2 * | 12/2013 | Lee et al. | 700/223 |
| 2009/0087295 | A1 | 4/2009 | Fritzsche | |
| 2010/0228386 | A1 * | 9/2010 | Kharkover | 700/218 |
| 2012/0213625 | A1 | 8/2012 | Roberts | |

OTHER PUBLICATIONS

Omar Uludag, GridPick: A High Density Puzzle Based Order Picking System with Decentralized Control, dissertation proposal to the Graduate Faculty of Auburn University, Oct. 10, 2012.
Cellular automaton, Wikipedia, accessed Oct. 28, 2013.
Kai Furmans, et al., Plug-and-Work Material Handling Systems, Karlsruhe Institute of Technology, Germany, Auburn University, USA, downloaded from Internet Oct. 18, 2013.
Gebhardt FlexConveyor—decentralized conveyor technology, http://www.gebhardt-foerdertechnik.de/en/products/flexconveyor.html, accessed Apr. 14, 2014.
U.S. Appl. No. 61/726,306, filed Nov. 14, 2012.
U.S. Appl. No. 61/734,603, filed Dec. 7, 2012.
U.S. Appl. No. 61/888,332, filed Oct. 8, 2013.

* cited by examiner

*Primary Examiner* — Kyle Logan
(74) *Attorney, Agent, or Firm* — Barnes & Thornburg LLP

(57) ABSTRACT

Randomly presented physical items can be temporarily stored in a grid-based material handling system, e.g., before they are handled by a robot. The grid-based material handling system arranges the randomly presented physical items within the grid, so that they exit the grid in an ordered sequence, e.g., for pickup by the robot. Programmable modules execute sequencing logic to move the items to target locations within the grid. The modules move interfering items out of the way of other items that are in transit to their target locations, as needed. The programmable modules allow the items to exit the grid when the requirements of a departure policy are met.

20 Claims, 8 Drawing Sheets

AUTOMATED ITEM SEQUENCING IN A HIGH-DENSITY GRID-BASED MATERIAL HANDLING SYSTEM

CROSS-REFERENCES TO RELATED APPLICATIONS

This application claims priority to and the benefit of U.S. Provisional Patent Application Ser. No. 61/726,306, filed Nov. 14, 2012, and claims priority to and the benefit of U.S. Provisional Patent Application Ser. No. 61/734,603, filed Dec. 7, 2012, and claims priority to and the benefit of U.S. Provisional Patent Application Ser. No. 61/888,332, filed Oct. 8, 2013, each of which is incorporated herein by this reference in its entirety.

GOVERNMENT RIGHTS

This invention was made with government support under Contract CMM10926346 awarded by the National Science Foundation. The government has certain rights in the invention.

BACKGROUND

In an automated material handling system, items, such as boxes or cartons, are loaded onto pallets by a robot. For example, in automotive assembly plants, mixed-model assembly lines sequence subassemblies or parts for final assembly. Preferably, the parts are delivered in sequence starting from the suppliers for the assembly lines. The sequence can be disrupted as a result of missing parts, delays, rework, parallel workstations, and other factors. Such disruptions require time consuming re-sequencing of the parts.

One approach to item sequencing involves an automated storage and retrieval system (AS/RS), which uses computer-controlled systems to place items into and retrieve items from defined storage locations. Items are retrieved from the AS/RS (typically by cranes) and fed to the robotic pallet building workstations. To do this, a warehouse management system constructs a desired sequence and releases requests to the AS/RS in accordance with the sequence. However, if there are multiple cranes working in parallel, for example, the requests are not always fulfilled in the proper order. As a result, items often arrive out of sequence.

Another way to achieve the sequence of items required by the palletizing robot is to use a circular sortation conveyor. Items enter and loop around the conveyor until they are required at the workstation. Some disadvantages of this system include increased cycle time of requested items, inflexibility with respect to throughput capacity, and poor utilization of floor space.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
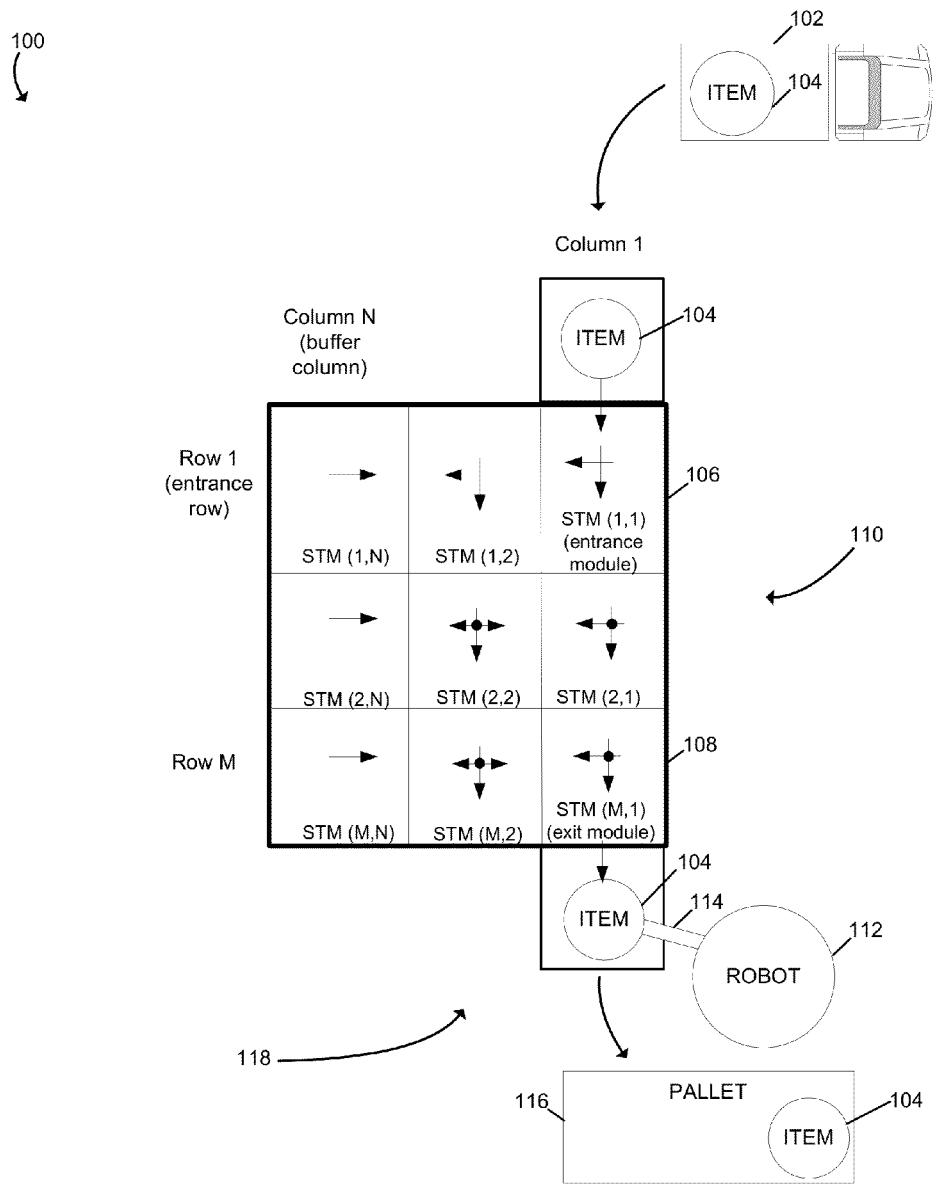
FIG. 1 is a simplified plan view diagram of at least one embodiment of an automated material handling system including a grid of programmable modules to sequence items as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Robotic pallet-building can reduce transportation and labor costs in the distribution industry and/or other industries. In a common application, robots pick cartons from a staging area and place them methodically on a pallet. Typical pallet-building objectives include: (1) to achieve a high packing density, (2) to adhere to product constraints (e.g., lighter items should be placed on top of heavier items), (3) to minimize inventory costs by shipping less-than-pallet quantities, and (4) to reduce labor costs in stores by placing items that are stocked close to one another in the store near to one another on the pallet. To achieve these and/or other objectives, a grid-based material handling system 100 as disclosed herein can arrange randomly-arriving items into a precise sequence for robotic placement on the pallet without the disadvantages of existing approaches. The grid-based material handling system 100 temporarily stores the items in their respective positions according to the sequence, and then releases the items in sequence when the items and all of the preceding items are in their proper positions.

Referring now to FIG. 1, an embodiment of the grid-based material handling system 100 is shown. A carrier 102, such as a truck or other transport vehicle, or other transport mechanism, typically delivers pallets of items 104 to a warehouse or other type of storage location. The items 104 arrive randomly at an entrance module 106 of the grid-based material handling system 100. The entrance module 106 is part of a grid 110, which is made up of a number of programmable modules STM(M,N), which are used to temporarily store the items 104 and to arrange the items 104 in an ordered sequence before they are delivered to a palletizer workstation 118. The modules of the grid 110 operate to accomplish the ordered sequence. The ordered sequence is typically pre-defined (e.g., by a human operator of the system 100, alone or with the assistance of computerized algorithms). At the palletizer workstation 118, an end effector 114 of a robot 112 picks the items 104 from an exit module 108 of the grid 110 and places the items 104 on a pallet 116 in the order in which they arrive at the exit module 108, which corresponds to the specified ordered sequence. The ordered sequence is typically a precise sequence in which the items 104 are to be picked by the robot 112. The sequence is defined (usually in advance) by a person and/or a computing system in accordance with the requirements of a particular palletizing task. For example, the palletizing sequence may be defined to address one or more of the palletizing objectives listed above. While a single robot 112 is shown in FIG. 1 for simplicity, multiple robots may be employed in other embodiments. For example, the system 100 may be comprised of multiple grids 110, each with its own robot, or a single robot may handle the picking of items from multiple grids (e.g., adjacent grids within the workspace of the end effector 114). Further, multiple robots may work in combination with a single grid 110, in some embodiments. For instance, one robot may pick a newly departed item while another robot is moving an already-picked item to the pallet 116.

The illustrative grid 110 is a planar grid of initially unoccupied programmable modules. The grid 110 includes a number of rows, M, and a number of columns, N, of programmable modules STM(M,N), which may also be referred to herein as "smart transport modules" (where M and N are positive integers). Each module STM(M,N) is capable of conveying items in one or more of the four cardinal directions (north, south, east, west). In the illustrative embodiments described herein, each of the modules STM(M,N) can convey items in all of the four cardinal directions. The mechanical capabilities needed for this type of movement are commercially available in the material handling industry. An example of a programmable module that is currently available is the FlexConveyor by the GEBHARDT Fordertechnik company.

Figure 2:
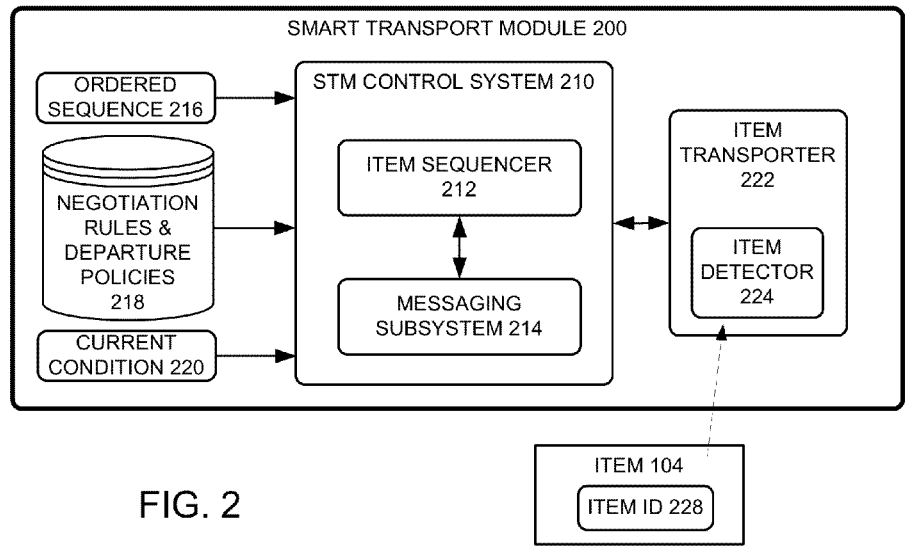
FIG. 2 is a simplified module diagram of at least one embodiment of a programmable module of FIG. 1.

The illustrative programmable modules STM(M,N) can communicate with each of their four neighboring modules by sending and receiving electronic messages using a decentralized (e.g., peer-to-peer or distributed) network architecture. In other embodiments, a master-slave type architecture (where one of the modules STM(M,N) or a centralized controller communicates messages to the individual modules STM(M,N), or another type of electronic communication network or mechanism, may be used. The modules STM(M, N) are each capable of detecting an item 104 residing on top of the module and determining the item 104's position in the ordered sequence (via a bar code reader or radio frequency identification (RFID) tag, for example). Additionally, each module STM(M,N) is configured to determine its own position in the grid 110. For example, once the particular arrangement of the grid 110 is set, each module's grid address (M,N) is, e.g., manually or by computer operations, input and stored in computer memory at the module. Each of the modules STM(M,N) is equipped with rollers or other conveying mechanisms, which are activated by the module's control system to move the items 104 into the grid 110, from module to module within the grid 110 and, at the appropriate time, out of the grid 110, as described below. An embodiment of a programmable module/smart transport module 200 is illustrated in FIG. 2, described below.

Figure 8:
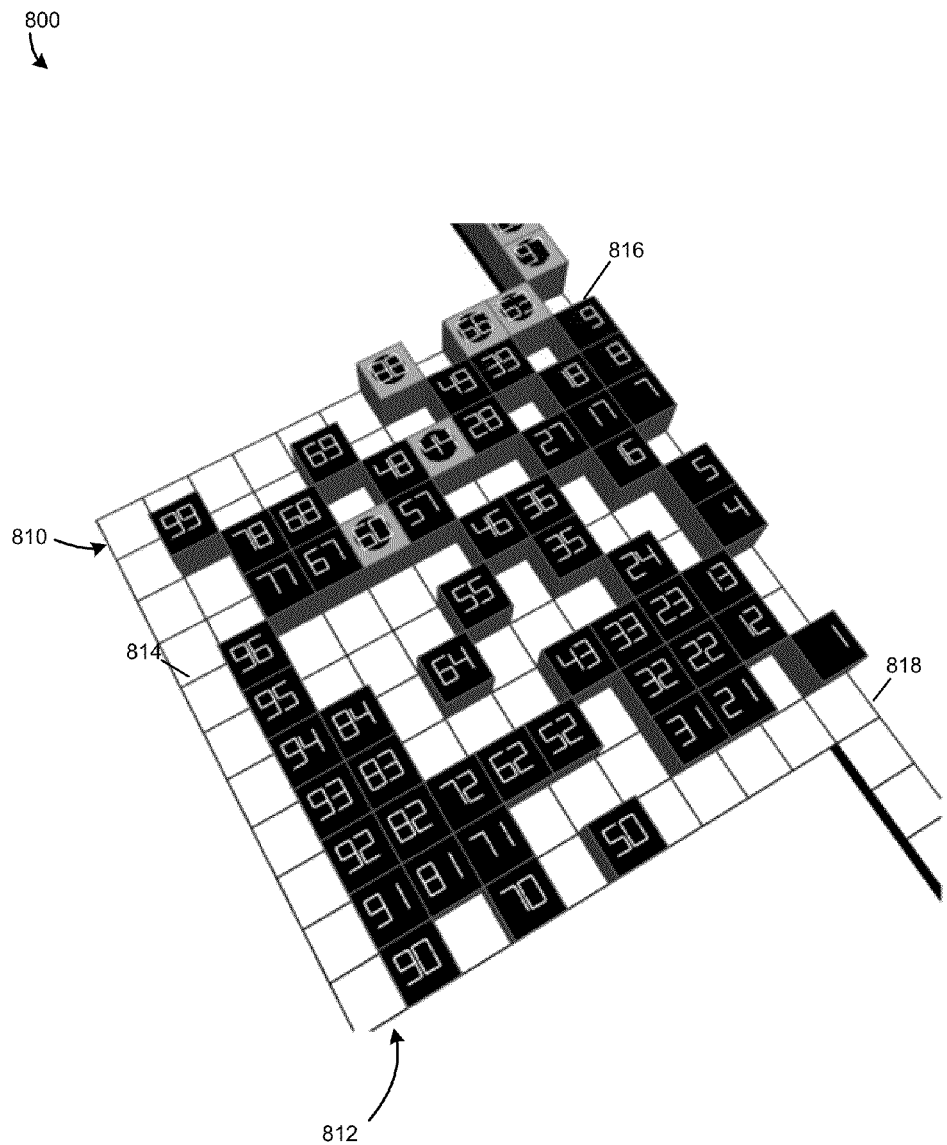
FIG. 8 is a simplified graphical depiction of the grid in a state in which items are in transport within the grid.
Figure 9:
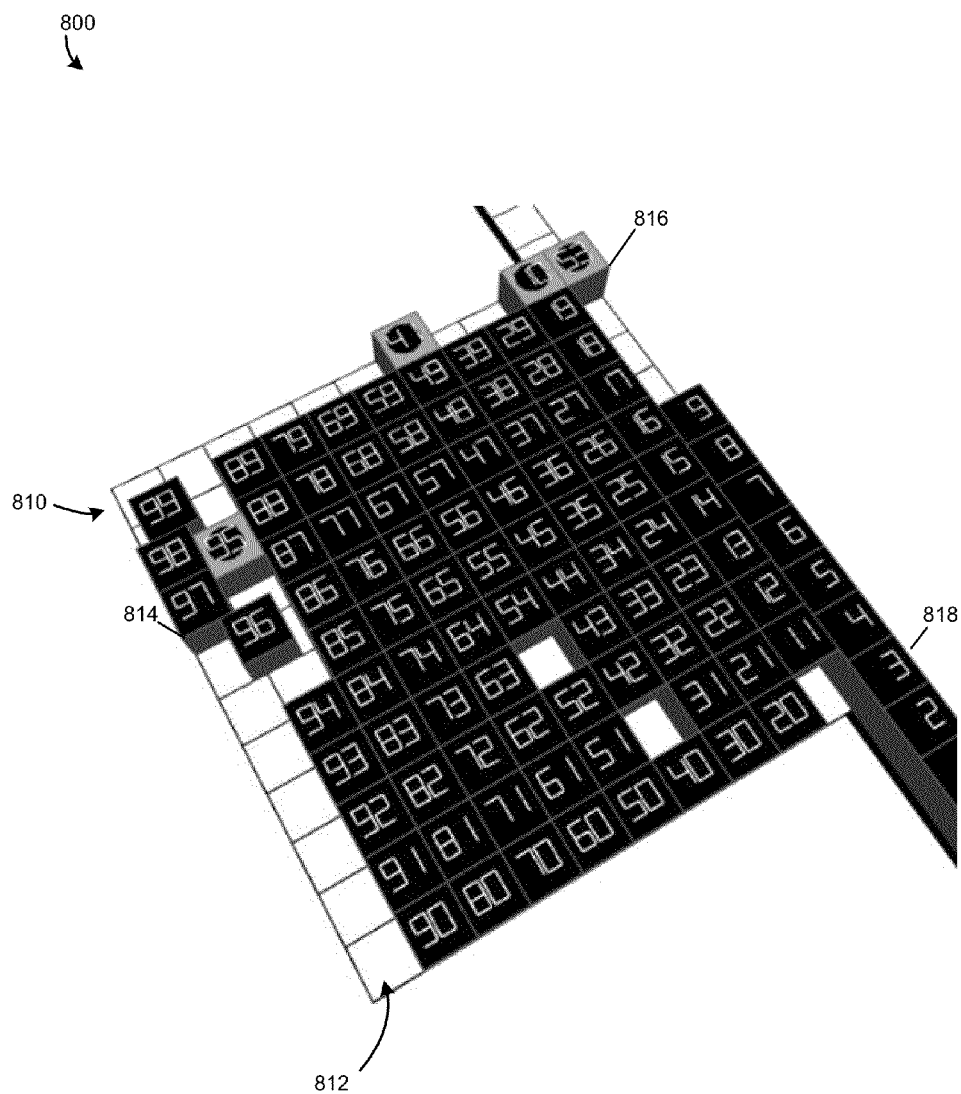
FIG. 9 is a simplified graphical depiction of the grid in a state in which items are departing the grid.

In FIG. 1, the programmable modules are designated as "STM(M,N)," where (M, N) refers to the row and column address of the module in the grid 110. That is, each module in the grid 110 has a defined position in the grid as indicated by its grid address. A 3×3 grid is shown in FIG. 1 for simplicity, but the size of the grid 110 and its configuration may be adjusted as needed, e.g., according to the anticipated volume of items to be handled by the material handling system 100. For example, to sequence one hundred items, an 11×11 grid may be constructed as shown in FIGS. 8-9. The features of the programmable modules STM(M,N), among other things, allow the size and/or configuration of the grid 110 to be modified to sequence any number of incoming items. That is, a greater number of items can be sequenced simply by adding modules to the existing grid, and a smaller number of items can be sequenced by removing modules from the grid. In the illustrative embodiment, the grid 110 is configured for "high density" storage and sequencing, e.g., so that all of the modules in the grid 110, except for those in the entrance row and the buffer column, are occupied with items 104 when the ordered sequence is complete.

In FIG. 1, the entrance row of the grid 110 is illustratively shown as row 1, and the buffer column is illustratively shown as column N. As disclosed herein, modules STM(M,N) in the entrance row and the buffer column are configured to handle items differently than the other modules in the grid 110. Items 104 enter the grid 110 via the upper right corner module (the entrance module 108) and travel from module to module, left or westward in the entrance row, until they reach their assigned or "target" column In the illustrative embodiment, the entrance row is used to move the items 104 to their respective target columns, but the entrance row is not used to store items in the ordered sequence. Similarly, the buffer column is used to temporarily store items 104 that would otherwise interfere with the travel of other items in the grid to their target positions. Interfering items can be moved laterally to the buffer column to get out of the way of a traveling item, and then returned to their original position once the traveling item has moved past. In other words, when all items 104 are in their proper positions, the modules STM(M,N) of the entrance row and the modules STM(M,N) of the buffer column are empty. Stated yet another way, in the illustrative embodiment, none of the items 104 should have a target address in either the entrance row or the buffer column, because the illustrative grid 110 is designed to have one additional row at the top and one additional column to the left, in addition to the number of rows and columns needed to accommodate the quantity of items sequenced by the grid 110. In some embodiments, the system 100 is configured so that once an item 104 has reached its target position, it can only be moved laterally if it is interfering in the path of another item's travel within the grid 110.

Figure 10:
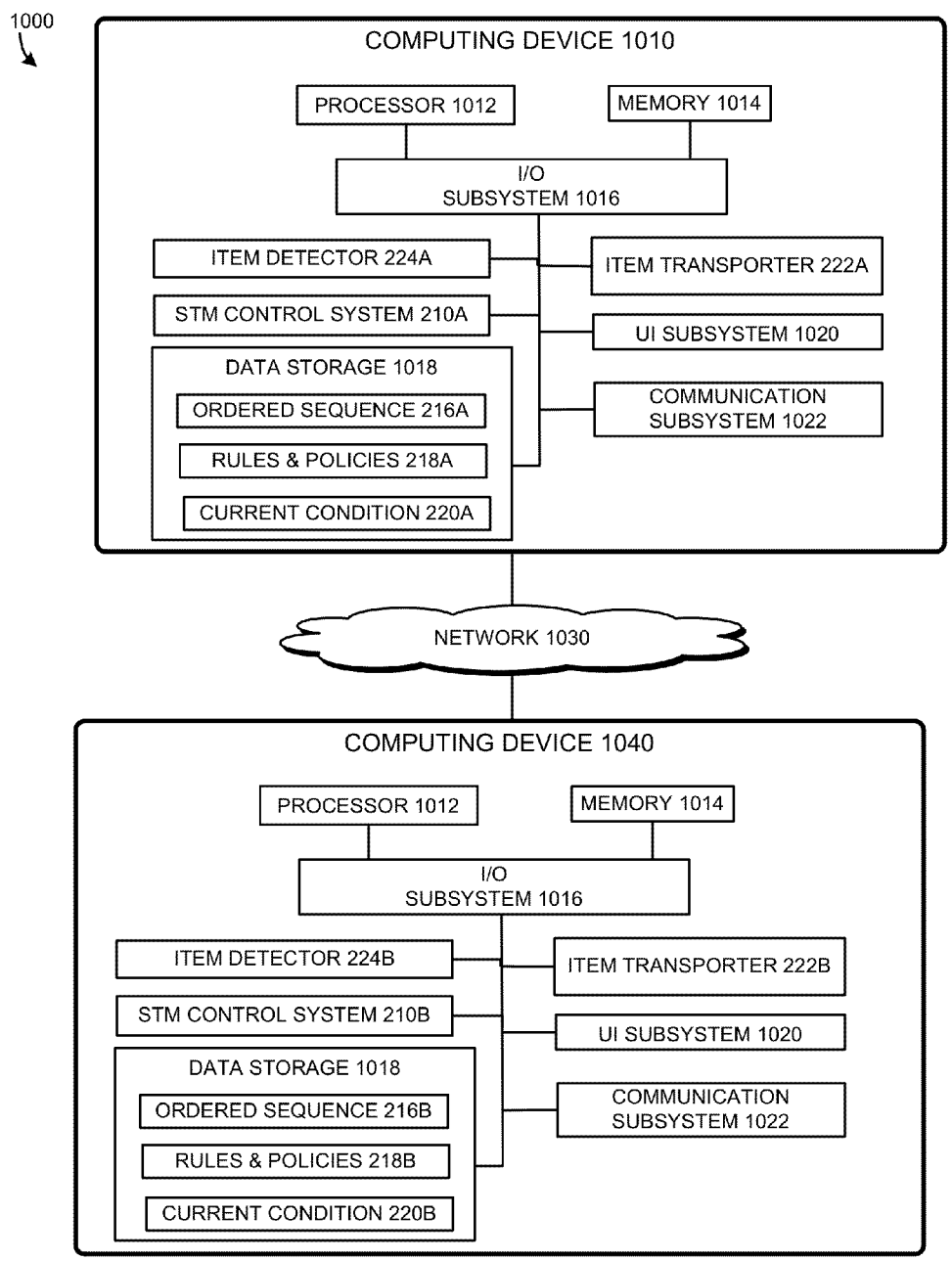
FIG. 10 is a simplified block diagram of an exemplary hardware environment with which at least one embodiment of the computing system of FIG. 1 may be implemented.

When the items 104 have reached their target columns in the entrance row, the modules STM(M,N) in such target column operate to move the items down or southward until the items 104 reach their target rows. To do this, rollers or other conveying mechanisms of the modules STM(M,N) are activated by the module's control system. Once the items 104 have reached their target positions in the grid 110 (e.g., the items 104 are located at both their target row and their target column), the modules STM(M,N) can move the items 104 laterally (e.g., left or right) temporarily, as needed to allow passage of other items seeking their own target positions in the grid 110. In the illustrative embodiment, the items 104 depart the grid 110 from the bottom right corner (e.g., the exit module 108). Accordingly, the grid 110 is designed so that the first item in the ordered sequence is moved to and stored in the bottom-right position (e.g., the exit module 108). The subsequent items (according to the ordered sequence) are assigned and moved to corresponding target positions in the grid 110. For instance, to sequence 100 items in an 11×11 grid such as shown in FIGS. 9-10, items 0-9 may be placed in the rightmost column (e.g., column 1), items 10-19 may be placed in the column to the left of the right-most column, and so on.

In the grid 110, the modules STM(M,N) move interfering items 104 laterally (e.g., left and right) to allow the downward/southward movement of items 104 traveling to their target rows. In doing so, the interfering items 104 leave their target positions temporarily and are then returned by the modules STM(M,N) to their target positions, to maintain the ordered sequence. In the illustrative system 100, interfering items 104 that have already moved to get out of the way of another item are not permitted to move farther away from their target position. In other words, the system 100 restricts lateral movement of interfering items 104 to one module STM(M,N) to the right or one module STM(M,N) to the left of the item 104's target position.

In FIG. 1, the arrows depicted in each module of the grid 110 indicate the direction(s) in which the module can move items, and the darkened circles shown on the arrows indicate modules STM(M,N) that can store items 104 according to the ordered sequence. For example, STM(1,2), a module of the entrance row, can move items leftward/westward and southward/downward, but does not correspond to a target position in the ordered sequence. On the other hand, STM(2,2), a module in the "body" of the grid 110, can move items 104 left/west or right/east and southward/downward, and corresponds to a target position of one of the items 104. As such, STM(2,2) is a storage location for an item in the ordered sequence. Further, STM(2,N), a module of the buffer column, can receive items 104 from the right/east and move items to the right/east. While terms such as "left," "right," "up," and "down," "top," "bottom," "east," "west," "north," "south," etc., may be used herein to describe movements of the items 104 in the grid 110, such terms are used for ease of discussion and not to limit the scope of this disclosure. Further, it should be understood that the specific examples described herein are intended for illustration purposes and not to limit the scope of the disclosure. For example, while the drawings show the entrance module 106 at the top right corner and the exit module 108 at the bottom right corner of the grid 110, such modules may be positioned at any location in the grid 110 and the rules for item movement adjusted accordingly. Similarly, movements characterized herein as "left" or "right," "up" or "down," etc., may correspond to movements in other directions in other embodiments, in accordance with the requirements of a particular design or implementation of the system 100.

Referring now to FIG. 2, additional details of an embodiment of a programmable module or smart transport module 200, which may be used in the grid 110 as the STMs (M,N), are shown. The smart transport module 200 includes an STM control system 210, including an item sequencer module 212 and a messaging subsystem 214. The STM control system 210, item sequencer 212, and messaging subsystem 214 are embodied as one or more computerized components (e.g., one or more hardware or software components, or a combination thereof) of the smart transport module 200. The STM control system 210 is communicatively coupled to one or more data storage devices (e.g., computer memory in which a database, electronic file, table, or other computerized data structure is embodied), which stores an ordered sequence 216, negotiation rules and departure policies 218, and a current condition 220. As shown in FIG. 10, described below, the ordered sequence 216, the rules and policies 218, and the current condition 220 may be stored in the same data storage device, in some embodiments. In other embodiments, portions of the ordered sequence 216, the rules and policies 218 and/or the current condition 220 may be stored in different data storage devices.

The smart transport module 200 is also communicatively coupled to an item transporter 222, including an item detector 224. The illustrative item transporter 222 is embodied as a mechanical or electromechanical device that can transport items from one location to another, such as a conveyor. In some embodiments, the item transporter 222 is sized specifically to correspond to the size of items to be conveyed thereby (e.g., a "unit-sized conveyor," which is designed to only hold one of the items 104 at a time). For example, the item transporter 222 may include a series or network of adjacent mechanical rollers that rotate one way to move an item 104 situated thereon in one direction, and rotate in the opposite direction to move the item 104 in the opposite direction. The axis of rotation of some rollers may be oriented perpendicularly to the axis of rotation of other rollers, to enable conveyance of items 104 in the four cardinal directions. Such rollers may be selectively turned on and off in response to control signals from the STM control system 210, depending on the direction in which the items 104 need to move within the grid 110.

The item detector 224 is embodied as a sensing device. For example, the item detector 224 may be embodied as a force sensor, a motion sensor, a bar code reader, an RFID transceiver, and/or others, or any combination thereof. As such, the item detector 224 detects the presence (and/or absence) of an item 104 situated on top of the item transporter 222. In response to signals (or the lack thereof) from the item detector 224, the STM control system 210 applies the negotiation rules and departure policies 216 to the detected current condition of the module 200, and determines the next action to be taken by the module 200 in accordance with the ordered sequence 216, as described further below. The detected current condition may be at least temporarily stored in computer memory, e.g., as the current condition 220.

In addition to detecting the presence of an item 104 at the item transporter 222, the item detector 224 identifies the detected item by reading or otherwise detecting its unique item ID 228 (which may be printed on a bar code that is attached to the item 104, for example). In some cases, the ordered sequence 216 may be embodied as a look-up table or other type of computerized data structure, which associates or "maps" the item ID 228 with a specific target address (e.g., row and column) of the grid 110, such that the smart transport module 200 may determine the item's target address when the item 104 arrives at the item transporter 222 based on the look-up table. In other embodiments, items 104 may arrive pre-configured with their respective target addresses. For example, each item's target address may be embodied in and read from, e.g., a bar code or other type of code or identifier that is affixed to the item 104 (by, for example, a printed label or tag).

Based on the presence or absence of an item 104 at the item transporter 222, the STM control system 210 executes the item sequencing logic/algorithms described herein, which are embodied in the item sequencer module 212. The item sequencer module 212 is communicatively coupled to the messaging subsystem 214. As described in more detail below, the item sequencer module 212 communicates current condition information about the current status of the module 200 to the messaging subsystem 214 at each time step or iteration of the item sequencer 212. In response to the current condition information, the messaging subsystem 214 issues the appropriate messages to one or more neighboring modules and/or other modules in the grid 110, in accordance with the negotiation rules and departure policies 218, to effectuate the movement of the items 104 within the grid 110 from the entrance module to the target locations or addresses within the grid 110, and then ultimately from the target locations/addresses to the exit module 108. As used herein, "neighboring modules" may refer to, among other things, one or more smart transport modules 200 that are located in a row or column of the grid 110 that is immediately adjacent to the module 200 in question. For example, in FIG. 1, the modules STM(1,2), STM(2,N), STM(2,1), and STM(M,2) are all neighboring modules of the module STM(2,2). As used herein, "laterally" or east-west adjacent may refer to, among other things, neighboring modules 200 that are in the same row as the module 200 in question (e.g., as to the module STM(2,2), the modules STM(2,N) and STM(2,1)). Similarly, "longitudinally" or north-south adjacent may refer to, among other things, neighboring modules 200 that are in the same column as the module 200 in question (e.g., as to the module STM(2,2), the modules STM(1,2) and STM(M,2)).

In the illustrative embodiment, each smart transport module 200 contains the same control logic (e.g., the control system 210, ordered sequence 216, and rules and policies 218), and each module 200 independently decides what action to take at each time step, based on its own current condition and the current condition of one or more of its neighboring modules 200. That is, each module 200 in the grid 110 assesses its own current condition (e.g., unoccupied, occupied by a moving item, or occupied by an item in its assigned target position), determines the current state of each of its neighboring modules, enters two rounds of sequencing logic referred to herein as "negotiations," in order to determine whether or not the module 200 will convey an item to another module 200 in the current time step or iteration, and, if the module 200 is to convey an item 104, the direction in which direction such item 104 is to be conveyed. In other embodiments, however, a centralized controller may be communicatively coupled to the messaging subsystem 214, such that it may execute the control logic and communicate instructions to the individual control modules 200 accordingly.

To form the grid 110, the requisite number of modules 200 are communicatively and mechanically connected to their neighboring modules 200 so as to be able to communicate with one another via electronic messages or signals and to be able to pass items 104 from one module 200 to adjacent modules 200. The communicative connections may be wired or wireless electronic connections, and may be accomplished by, for example, connecting communication ports of the modules 200 via cables. The mechanical connections may be accomplished by any suitable type of mechanical coupler or fastener, such as a bracket, tether, or connector. Once all modules 200 are communicatively connected in the grid 110, each module 200 is assigned its address, e.g., the row and column number corresponding to its position in the grid 110. Knowledge of its own address within the grid 110 enables each module 200 to assess its current condition in the event an item 104 is detected thereon. For example, a module 200 can compare its own grid address to the target address of an item 104 that is detected by the item detector 224, and determine based on such comparison whether the item 104 has reached its target address or needs to be moved to another module 200 in the grid 110.

Figure 3:
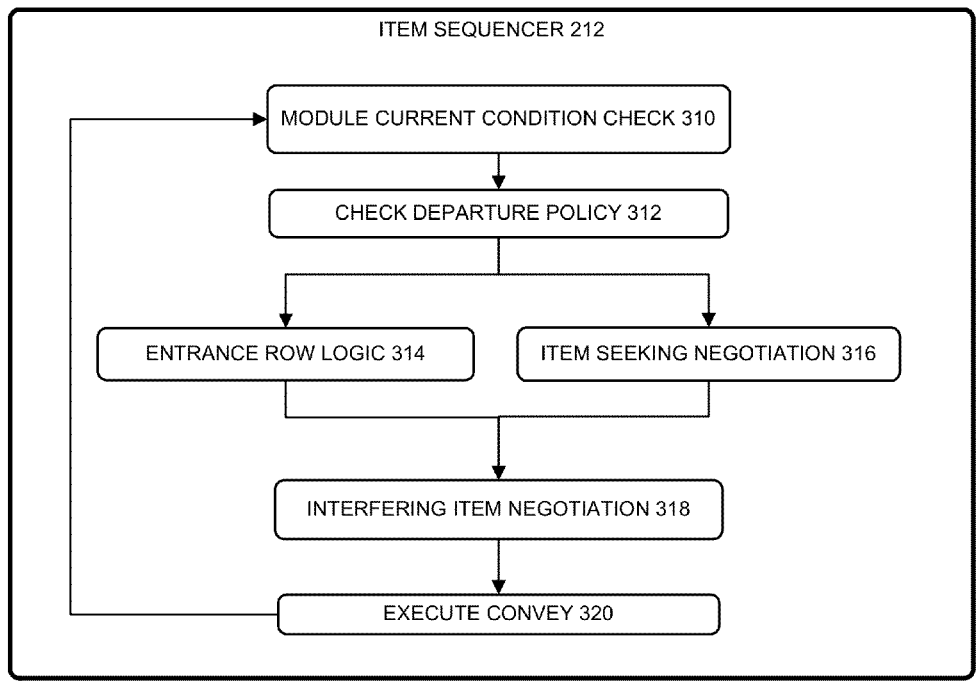
FIG. 3 is a simplified module diagram of at least one embodiment of the item sequencer of FIG. 2.

Referring now to FIG. 3, illustrative subcomponents of the item sequencer 212 are shown, including a module current condition check subcomponent 310, a check departure policy subcomponent 312, entrance row logic 314, item seeking negotiation logic 316, interfering item negotiation logic 318, and an execute convey subcomponent 320. These subcomponents are embodied as one or more computerized components (e.g., one or more hardware or software components, or a combination thereof) of the item sequencer 212. In operation, the illustrative item sequencer 212 iterates through the sequence of subcomponents in each time interval of operation. Additionally, the item sequencer 212 executes the same subcomponent at the same time for all of the modules 200 in the grid 110. In other words, the modules 200 in the grid 110 are synchronized to operate in the same "phase" at the same time. Except for the modules 200 of the entrance row, all of the modules 200 are executing the same subcomponent of the item sequencer 212 at any given time step. However, some of the modules 200 in the grid 110 may behave differently than other modules, even though they are executing the same subcomponent at the same time. For example, depending on the module 200's current condition, a module may send a message to other modules 200, propagate a message that it has received from another module 200, affirmatively not send a message to other modules 200, or affirmatively not propagate a message received from another module 200.

When the item sequencer 212 is executing the current condition check 310, each of the modules 200 in the grid 110 determines if it is occupied (e.g., checks whether the item detector 224 detects the presence of an item 104), and updates its current condition accordingly. The module 200 stores the current condition information temporarily (e.g., in a cache memory) or until no longer needed (e.g., until it is supplanted by a new current condition at a subsequent next time interval). In the illustrative embodiment, there are three possible values for the module current condition: "empty," "occupied," and "seeking" (where empty=no item detected, occupied=item detected and item is at its target position and seeking=item detected and item is not yet at its target position). The module 200 determines its current condition by reading the item id 228 (e.g., from an RFID tag or a bar code) and comparing the item's target position in the grid 110 to the module's own position in the grid 110, as mentioned above.

Once the item sequencer 212 has determined the module 200's current condition for all of the modules in the grid 110, the check departure policy 312 is executed. During the check departure policy 312, each module 200 checks to see if it meets a "departure condition," meaning that the module 200 checks to see if the ordered sequence is complete and the items 104 are ready to leave the grid 110. There are a number of different departure policies that may be used, each of which may have different departure conditions. The departure policy applicable to the grid 110 may be selected based on the requirements or the design of the automated material handling system 100, and/or other requirements or criteria.

In one example, a first departure policy requires that all of the items 104 in the ordered sequence 216 be in the grid 110 and sequenced before any items leave. In this case, the module 200 sends messages to its north and west neighboring modules, to see if those modules 200 are carrying their respective assigned items 104 in accordance with the ordered sequence 216. If all of the items 104 in the grid 110 meet this condition, then all of the modules 200 in the grid 110 are considered to meet the departure condition. As another example, a second departure policy requires that (1) all modules in a particular column in the grid 110 are carrying their required items and (2) all columns to the right have met the departure condition. In both cases, if a module meets the departure condition, it no longer executes the negotiating events to follow. Additional details of the exemplary departure policies are described below with reference to FIG. 5. The departure policies are typically pre-defined and stored as, for example, computer-readable data, rules, or instructions (e.g., Boolean logic implemented in a computer programming language), in, for instance, the rules and departure policies 218.

In the illustrative example, the item sequencer 212 executes the entrance row logic 314 and the item seeking negotiation 316 during the same phase of the iteration, but the entrance row logic 314 is only executed by modules 200 that are located in the entrance row while the item seeking negotiation 316 is executed by all of the other modules 200 in the grid 110. The entrance row logic 314 controls the movement of items 104 in the entrance row 314, while the item seeking negotiation 316 controls the movement of items 104 that are in their respective target columns but still need to move to their target row. An embodiment of the entrance row logic 314 is described in more detail below with reference to FIG. 4. An embodiment of the item seeking negotiation 316 is described in more detail below with reference to FIG. 6.

Following completion of the item seeking negotiation 316 by all of the modules 200, the item sequencer 212 executes the interfering item negotiation 318 to handle the movement of interfering items out of the way of other "seeking" items 104 in the grid 110. An embodiment of the interfering item negotiation 318 is described in more detail below with reference to FIG. 7.

After execution of all of the foregoing modules 310, 312, 314, 316, 318, the item sequencer 212 enters a convey phase in which the execute convey 320 communicates with the item transporter 222 to execute the movement decisions in accordance with the updated current condition of each of the modules 200 in the grid 110. In some embodiments, negotiation rules 218 are established such that the final condition of a module 200 cannot be a "request" condition (e.g., request left, request right, etc.). After the execute convey 320, the item sequencer 212 increments the time interval and begins the new time interval by returning to the module current condition check 310 and repeating the process described above. The item sequencer 212 repeats the above process for as many time intervals or "time steps" as are needed to complete the storage of items 104 in the ordered sequence 216 and convey the ordered items 104 out of the grid 110. For example, the item sequencer 212 may conclude its execution if there are no items 104 detected by any of the modules 200 in the grid 110.

Figure 4:
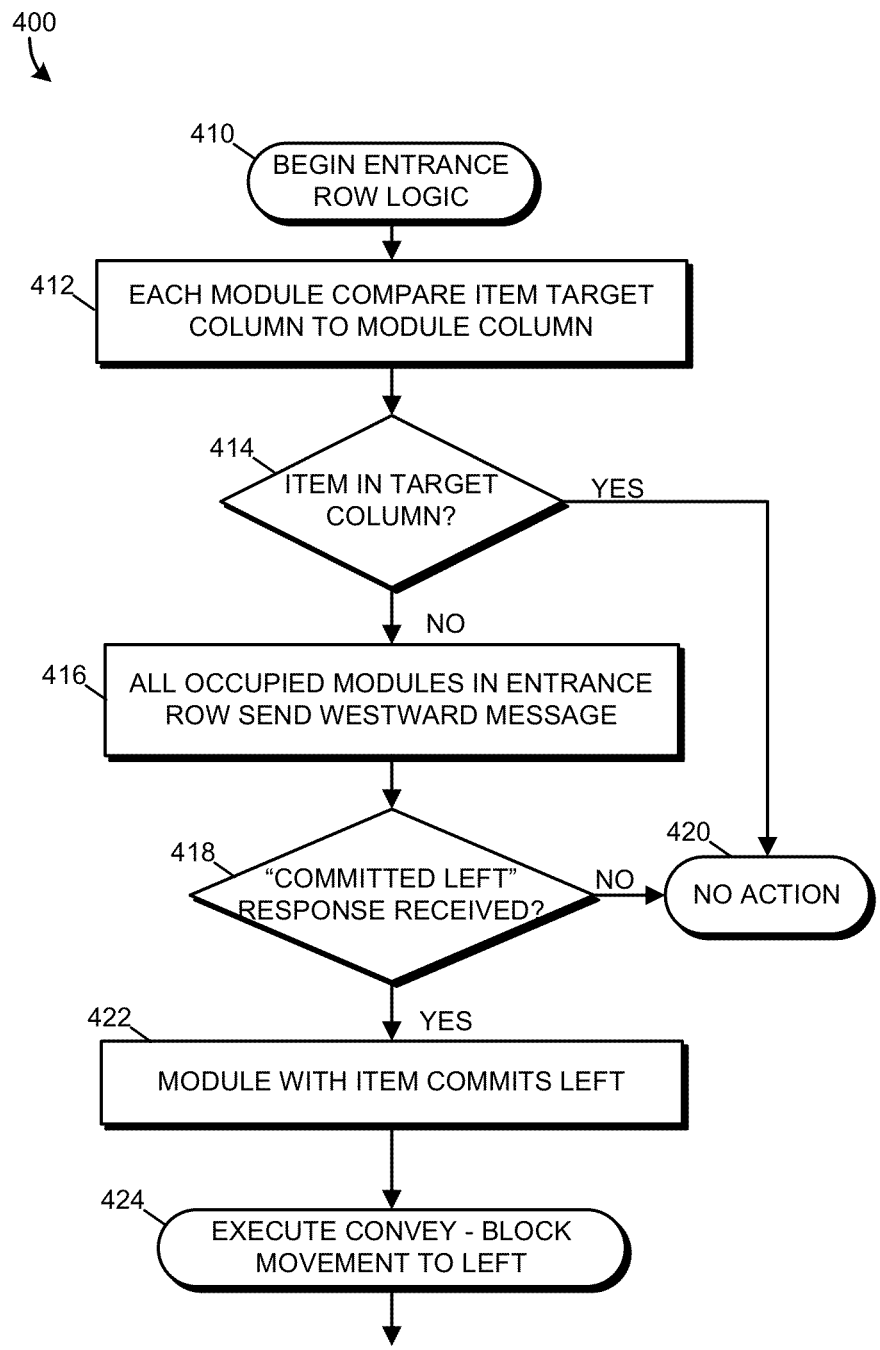
FIG. 4 is a simplified flow diagram of at least one embodiment of a method by which the system of FIG. 1 may handle items entering the grid.

Referring now to FIG. 4, an illustrative method 400 by which the automated material handling system 100 may handle incoming items, e.g., items 104 in the entrance row of the grid 110, is shown. The method 400 may be embodied as computerized programs, routines, logic and/or instructions executed by the system 100, for example by the item sequencer 212 of the smart transport modules 200. In the illustrative embodiment, all of the modules 200 in the grid 110 may execute the method 400 synchronously.

As noted above, the entrance row of the grid 110 handles items 104 differently than other parts of the grid 110. At block 410, the system 100 initiates execution of the method 400 by the modules 200 that are located in the entrance row of the grid. Other modules 200 in the grid 110 may execute the item seeking negotiation logic 316 during the same time interval in which the entrance row modules 200 are executing the method 400. The system 100 may begin the method 400 upon successful completion of the execution of the check departure policy 312, for example.

At block 412, the entrance row modules 200 activate their respective item transporters 220 to move the incoming items 104 to their respective target columns, within the entrance row. To do this, the entrance row modules 200 each determine whether they are carrying an item 104 (by, e.g., the item detector 224). If an entrance row module 200 is carrying an item 104, the module 200 compares the target column information of the carried item 104 to the module 200's own assigned column number (e.g., the module 200's column address in the grid 110). At block 414, the module 200 determines whether the carried item 104 is at its assigned target column based on the comparison performed at block 412. If the target column of the carried item 104 matches the carrying module 200's own column address, the module 200 concludes that the item 104 is at its target column and proceeds to block 420, at which no action is taken because the carried item 104 does not need to be moved to another column. If the target column of the carried item 104 does not match the carrying module 200's own column address, the module 200 concludes that the item 104 has not yet reached its target column and needs to continue movement leftward/westward in the entrance row of the grid 110 It should be understood that the direction of movement is leftward/westward because in the illustrative embodiment, items 104 enter the grid 110 at the right-most module 200 of the entrance row, and that the movement may occur in other directions in other embodiments. At block 416, the module 200 carrying the item 104 that needs to move westward sends a "request left" message to all of the modules 200 that are to the left or westward of the carrying module 200 in the entrance row of the grid 110. All other modules 200 that are carrying items 104 in the entrance row that need to move westward also send "request left" messages to the westward modules 200, similarly. The westward modules 200 that receive the request left messages do not respond unless their current condition is "empty." In other words, the only modules 200 that respond to the request left messages are modules 200 that are not currently carrying an item 104. The empty modules 200 respond to the request left message by sending a "committed left" message back to the module 200 that initiated the request left message, through any intervening modules 200 that are located in between the empty module 200 and the request left initiating module 200 (e.g., the intervening modules 200 each propagate the message originally sent by the empty module 200 eastward toward the request left initiating module 200).

At block 418, the request left initiating module 200 determines whether it has received a committed left response message. If the request left initiating module 200 does not receive a committed left response, the request left initiating module 200 concludes that there are no empty modules westward in the entrance row, and thus westward movement is not currently possible. As a result, the method 400 proceeds to block 420 and takes no action. If, however, the request left initiating module 200 receives a committed left response, the request left initiating module 200 updates its current condition to "committed left" to indicate that it will move its item 104 to the leftward adjacent module 200 when it is time for item movements to occur (e.g., during the execute convey phase 320). Thus, in the method 400, there are two "waves" of messages generated by modules 200 in the entrance row: the leftward/westward request left messages sent by the request left initiating modules 200 and the rightward/eastward committed left messages sent in reply by the empty modules 200 in the entrance row. At block 424, the leftward movement of items 104 in the entrance row is executed by all of the modules 200 in the entrance row that have a current condition of "commit left" (e.g., all of the modules 200 that are between the empty module 200 and the request left initiating module 200, and including the request left initiating module 200. To do this, each of the modules 200 activates the conveying mechanism (e.g., rollers) of its respective item transporter 222 to move the items 104 in the westward direction. The movement of the items 104 is conducted by the entrance row modules 200 synchronously, resulting in a "block movement" of items 104 to the left in the entrance row.

Figure 5:
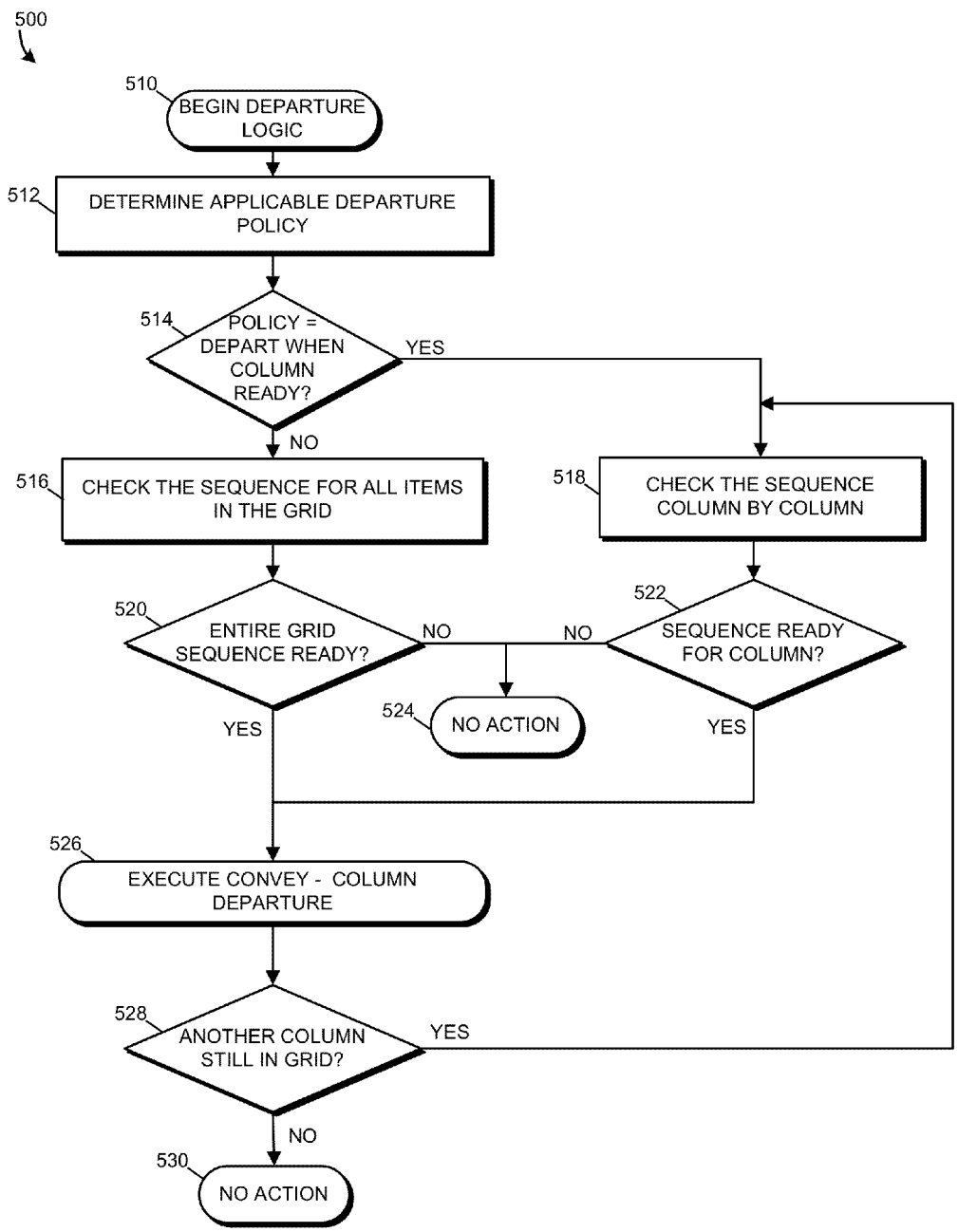
FIG. 5 is a simplified flow diagram of at least one embodiment of a method by which the system of FIG. 1 may handle the departure of items from the grid.

Referring now to FIG. 5, an illustrative method 500 by which the automated material handling system 100 may handle the departure of items 104 from the grid 110 is shown. The method 500 may be embodied as computerized programs, routines, logic and/or instructions executed by the system 100, for example by the item sequencer 212 of the smart transport modules 200. In the illustrative embodiment, all of the modules 200 in the grid 110 may execute the method 500 synchronously.

At block 510, the system 100 initiates execution of the method 500 by the modules 200 of the grid 110. The system 100 may begin the method 500 upon successful completion of the execution of the module current condition check 310, for example. At block 512, the system 100 determines the applicable departure policy. Disclosed herein are two illustrative departure policies that may be implemented alternatively by the system 100: a "column leave when sequence ready" policy and a "column leave when column ready" policy. According to the column leave when sequence ready policy, a column of items 104 is ready for departure from the grid 110 when all of the column's member items 104 are in their respective target positions according to the ordered sequence, and all of the items 104 of the preceding columns in the grid 110 have already departed from the grid 110 (where "preceding columns" refers to items 104 that are in the columns between the column of the exit module 108 and the column currently being evaluated, and includes the column of the exit module 108). Other suitable departure policies may be used. However, in general, all departure policies provide that items 104 may depart from the grid 110 only when their predecessor items 104 (e.g., the preceding items according to the ordered sequence) are in their respective target locations in the grid 110 (e.g., to effectuate the ordered sequence of items 104). The departure policies are stored in computer memory, e.g., in the rules and policies 218.

At block 514, the system 100 determines whether the applicable departure policy is "depart when column ready." If the system 100 concludes that the departure policy is not depart when column ready, the illustrative system 100 assumes that the departure policy is "depart when sequence ready" and proceeds to block 516. At block 516, the system 100 checks to see if all of the items 104 in the preceding portions of the grid 110 are in their respective target locations (e.g., whether the ordered sequence is complete for the entire grid 110). If at block 520 the system 100 concludes that all of the items 104 in the grid 110 are ready to depart the grid 110, the system proceeds to block 526. If at block 520 the system 100 concludes that all of the items 104 in the grid 110 are not ready to depart the grid 110, the system 100 proceeds to block 524, where no action is taken.

If at block 514 the system 100 determines that the applicable departure policy is "depart when column ready," the system 100 proceeds to block 518, where it checks the ordered sequence column by column That is, each column of the grid 110 is checked individually to see if all of the modules 200 in the column are "occupied;" that is, carrying an item 104 that is in its target position. At block 522, the system 100 determines whether the column currently being checked for departure readiness is ready to depart, based on the criteria evaluated at block 518. If the system 100 determines that the column is not ready to depart (e.g., all modules 200 in the column are not occupied with items 104 in their target positions), the system 100 proceeds to block 524 and takes no action. If the system 100 determines that the column is ready to depart (e.g., all modules 200 in the column are occupied with items 104 in their target positions), the system 100 proceeds to block 526. At block 526, the items 104 in the grid 110 are moved (e.g., rightward/eastward) column-by-column to the column in which the exit module 108 is located ("departure column"), and then moved (e.g., downward/southward) to the exit module 108 and out of the grid 110. The movement of the items 104 is conducted by the modules 200 synchronously, resulting in block movements of the columns of items 104 to the departure column and then out of the grid 110. To accomplish such movements, each module 200 activates the conveying mechanism (e.g., rollers) of its respective item transporter 222. At block 528, the system 100 checks to see if there is another column of items 104 in the grid 110 that may be ready to depart. If the system 100 concludes that there is another column of items 104 in the grid, the system returns to block 518 and proceeds to evaluate the column as described above. If the system 100 determines that there are no other columns of items 104 left in the grid 110, the system 100 proceeds to block 530 and takes no action.

To check the ordered sequence for departure readiness, the system 100 (e.g., the messaging subsystem 214) initiates message passing from the exit module 108 to the other modules 200 in the grid 110. In the illustrated embodiment, since the exit module 108 is located at the bottom right-most position of the grid 110, the departure readiness messages originate at the exit module 108 and propagate module-to-module to the north and west of the exit module 108 all the way out to the modules 200 that are furthest away from the exit module 108 in all directions. The modules 200 in the rightmost column will forward the messages both north and west, depending on the current condition of the respective module 200. That is, when a departure readiness message is received by a module 200, the receiving module 200 determines if it is carrying an item 104 that is in its target position as described above. If the receiving module 200 is not carrying an item 104 at all or is carrying an item that is not in its target position, the receiving module 200 will not forward the departure readiness message on to other modules 200 and the message propagation will end. If the receiving module 200 is carrying an item 104 that is in its target position, the receiving module 200 will continue the propagation of the departure readiness message across the grid 110. If the departure readiness message reaches the modules 200 in the grid that are the farthest away from the exit module 108 in all directions, the modules 200 return the message in the opposite direction as a "sequence ready" message. The modules 200 that are located in between the outermost modules in the grid 110 and the exit module 108 propagate the sequence ready message back to the exit module 108, module by module. Thus, if the exit module 108 receives a sequence ready message, the system 100 knows that the items 104 in the grid 110 (or a portion thereof, depending on the departure policy) are ready for departure from the grid 110.

After receiving the sequence ready message, the exit module 108 (which, in the illustrative embodiment, stores the first item 104 in the ordered sequence) broadcasts another message to initiate the movement of items 104 out of the grid 110 ("departure movement"). To do this, the exit module 108 sends out a message to its adjacent north neighboring module 200, and the north neighboring module 200 continues the propagation of the departure movement message to all of the modules 200 that are in the same column as the exit module 108 and the north neighboring module 200. When the last module 200 in the column receives the departure movement message, it responds with a "commit down" movement message, which is propagated by the other modules 200 in the column back to the exit module 108. When the exit module 108 has received the commit down message, the system initiates the movement of the items 104 out of the grid 110.

When the exit module 108 detects that it is empty (not currently carrying an item 104), the exit module 108 sends a message to its west neighboring module 200 to move the next column of items 104 into position for departure. In the same way, the west neighboring module 200 that receives this message sends a message to its north neighboring module 200, which then triggers the movement of all of the items in the column of the west neighboring module 200 into position for departure (e.g., to the right/east).

If portions of the ordered sequence are complete when items 104 start to depart the grid 110, the system 100 can move those portions toward the departure position (e.g., eastward) as a block. In this case, the system 100 may move other columns of items 104 to the right (toward the departure position) so that they are ready for departure. Further, to accomplish a block movement toward the departure position, each module 200 sends a message leftward, which propagates to the leftmost module 200 in the grid 110 that is carrying an item 104.

Depending on the departure policy, the system 100 may check the readiness of the ordered sequence in a particular column If the departure policy is "depart when the column is ready," all columns are not always ready even if the departure has already started. As a result, there may be two additional message passing rounds in order to verify that the ordered sequence is correctly ordered and ready for departure, where the first round is initiated at the exit module 108 to determine whether the modules 200 are occupied with items 104 that are in their target positions, and the second round is the feedback from the modules 200 responding to the "departure ready message."

An embodiment of the "depart when sequence is ready" departure policy specifies that items 104 may leave the grid 110 only after the entire ordered sequence (e.g., the entire grid 110) is ready. In the illustrated embodiment, the first item in the ordered sequence (and thus the first item 104 to leave the grid 110) is located at the bottom right position (the exit module 108). Therefore, whenever the first item 104 in the ordered sequence arrives at its target position, the module 200 carrying the item 104 triggers a sequence check mechanism and sends messages to the other modules 200 in the grid 110, in both north and west directions. In this way, messages propagate all across the grid 110, and when the left-most modules 200 (farthest away from the exit module 108) receive the message, they send a reply message, which is propagated back to the exit module 108. If a module 200 is empty or is not occupied with an item that is in its target position, the module 200 does not respond to the incoming message. In this way, the message becomes interrupted and the item departure does not start. If the message returns to the exit module 108, the exit module 108 knows that the entire sequence is ready and items can start to leave the grid 110.

In an embodiment of the "depart when column ready" departure policy, items 104 start to leave when their assigned column and all of the predecessor columns are ready to depart. In some cases, the system 100 permits items 104 to depart as soon as their predecessors are in their target positions according to the ordered sequence. In such event, the exit module 108 (e.g., the bottom right module) initiates the messages that are sent out to the other modules 200 in the grid 110. In response, each of the other modules 200 checks to see if its own row and column address matches the target row and column address of the item 104 that is currently being carried by the module 200. However, in this case, the module 200 propagates the message only to its north neighboring module 200 and not to any westward modules 200. This message propagates and returns from the row that is furthest away from the message sending module 200 (e.g., the top row of the grid 110), if all items 104 are in their target positions in the column of the message sending module 200. If the message sending module 200 receives the response message, it forwards the message to its adjacent west neighboring module 200, and the west neighboring module triggers a similar sequence check in its own column by sending a message to its adjacent north neighboring module 200.

Further, in an embodiment of the "depart when column ready" departure policy, the message route begins at the exit module 108 (e.g., the bottom right module 200), and a separate sequence check is done for each column When a column's sequence is ready to depart the grid 110, the exit module 108 forwards the message to the next adjacent west neighboring module 200 for additional subsequent sequence checks. If any module 200's row and column number does not match with the target row and column of the item 104 that it is currently carrying, the message passing stops and departure cannot start for the specified column After the message passing for the sequence check (which verifies that items 104 are in their target positions according to the ordered sequence), if the exit module 108 determines that the sequence is ready for the entire grid 110 or for a particular column (depending on the departure policy) to depart, the exit module 108 starts a negotiation similar to the item seeking or north-south negotiation described below. The exit module 108 will send out a message to its adjacent south neighboring module 200, and if the south neighboring module 200 is empty, the south neighboring module 200 moves its item 104 to the exit module 108 for departure from the grid 110. Additionally, the south neighboring module 200 forwards the message to its adjacent north neighboring module 200. In this way, the modules 200 in the column can execute a block movement to the south. To accomplish such movements of items 104, each module 200 involved in the movement activates the convey mechanism (e.g., rollers) of its respective item transporter 222).

When the items 104 in the first column have departed the grid 110 entirely, the exit module 108 detects that it is empty and sends a message to its adjacent west neighboring module 200. This message initiates a block move of the items 104 from left to right, which is similar to the interfering item (e.g., west-east) negotiation, described below, except that in this case, there are two waves of messages. To accomplish such movements of items 104, each module 200 involved in the movement activates the convey mechanism (e.g., rollers) of its respective item transporter 222).

Figure 6:
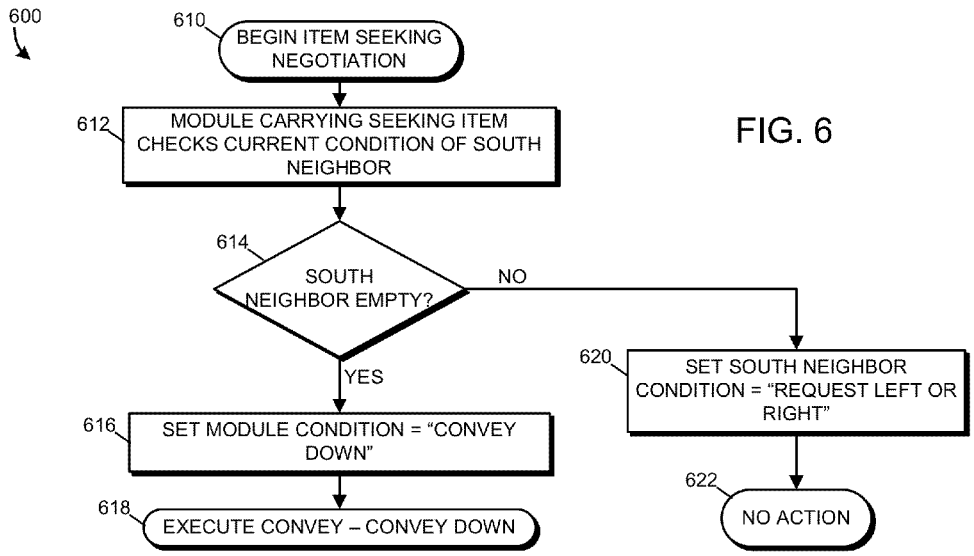
FIG. 6 is a simplified flow diagram of at least one embodiment of a method by which the system of FIG. 1 may transport items from one module to another in the grid.

Referring now to FIG. 6, an illustrative method 600 by which the automated material handling system 100 may conduct an "item seeking" (e.g., north-south) negotiation, for the movement of items 104 within the grid 110, is shown. The method 600 may be embodied as computerized programs, routines, logic and/or instructions executed by the system 100, for example by the item sequencer 212 of the smart transport modules 200. In the illustrative embodiment, all of the modules 200 in the grid 110 may execute the method 600 synchronously.

At block 610, the system 100 initiates execution of the method 600 by the modules 200 of the grid 110. The system 100 may begin the method 600 upon successful completion of the execution of the check departure policy 312, for example. More specifically, the method 600 deals with items 104 that have already reached their target column (e.g., via the entrance row logic 314), but have not yet reached their target row. At block 612, each "seeking" module 200 (a module that is currently carrying an item 104 that is not yet in its target position in the grid 110, according to the ordered sequence) sends a message to its adjacent south neighboring module 200 to determine whether the south neighboring module 200 is empty (e.g., not currently carrying an item). At block 614, the system 100 determines whether the south neighboring module 200 is empty (e.g., via the item detector 224 detecting the presence of an item 104). If the system 100 determines that the south neighboring module 200 is empty, then at block 616 the south neighboring module 200 responds with a message indicating that it is committed to receive and the item seeking module 200 sets its current condition to "convey down." At block 618, during the execute convey phase 320, all modules 200 having a condition of "convey down" activate their respective item transporters 220 to move their items 104 to their adjacent south neighboring module 200. Where the item sequencer 212 proceeds to the interfering item negotiation 318 as the next phase, modules 200 that have a current condition of "convey down" will take no action during the interfering item negotiation 318 and simply wait for the execute convey phase 320 to begin.

If, at block 614 the system 100 determines that the south neighboring module 200 is not empty, at block 620 the south neighboring module 200 sets its current condition to "request left or request right" so that when the interfering item negotiation 318 begins, the south neighboring module 200 will execute the interfering item logic described below. At block 622, no action is taken, other than the system 100 waits for all of the modules 200 in the grid 110 to complete the item seeking negotiation logic 316 (or the entrance row logic 314, for modules 200 located in the entrance row), before proceeding to the interfering item negotiation 318. In other words, the item seeking or north-south negotiation places each module 200 in a beginning state for the interfering item or east-west negotiation to follow. For example, when a module 200 with an occupied (but not moving) item 104 receives a message from its north neighboring module 200 that the north neighboring module 200 wants to send its item 104 southward, the module 200 receiving such message sets its current condition to "request left or right" for the interfering item negotiation 318.

Figure 7:
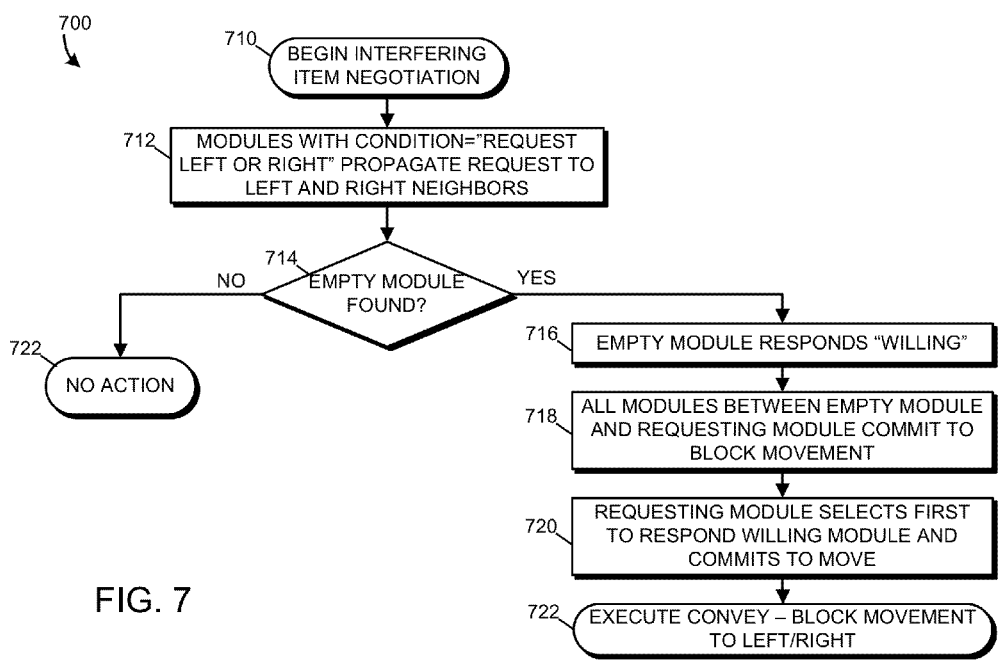
FIG. 7 is a simplified flow diagram of at least one embodiment of a method by which the system of FIG. 1 may handle interfering items in the grid.

Referring now to FIG. 7, an illustrative method 700 by which the automated material handling system 100 may conduct an "interfering item" (e.g., east-west) negotiation, is shown. The method 700 may be embodied as computerized programs, routines, logic and/or instructions executed by the system 100, for example by the item sequencer 212 of the smart transport modules 200. In the illustrative embodiment, all of the modules 200 in the grid 110 may execute the method 700 synchronously.

At block 710, the system 100 initiates execution of the method 700 by the modules 200 of the grid 110. The system 100 may begin the method 700 upon successful completion of the execution of the item seeking negotiation 316, for example. In general, the item seeking or east-west negotiation attempts to clear the way for items 104 that are in their target column and need to move downward to their target rows. At block 712, the modules 200 that have a current condition of "request left or right" send messages to their respective laterally adjacent (e.g., left and right) neighboring modules 200, to determine whether either of such modules can receive an item 104 passed in the appropriate direction. If the modules 200 receiving the request left or right message are not empty, such modules 200 propagate the request left or request right message laterally (e.g., left and right) until an empty module 200 is found in the same row. If an empty module 200 is found (block 714), then at block 716, the empty module 200 responds to the request left or right message with a "willing" message indicating that it can receive an item 104. At block 718, all of the intervening modules 200 between the module 200 issuing the request left or right message and the empty module 200 commit to convey their respective carried items 104 in a block movement (where all of the committed modules 200 move their items 104 in the same direction at substantially the same time). At block 720, the module issuing the request left or right message receives the willing message responses and makes a decision to move based on the first-received willing message. In other words, if modules 200 on both lateral sides of the requesting module 200 respond "willing," the requesting module 200 commits to move its item 104 in the direction of the first-to-respond willing module 200. The requesting module 200 sends a commit message to the modules 200 that are between it and the first-to-respond willing module 200. In other embodiments, of course, the requesting module 200 may use other criteria for determining which of multiple willing modules to select. At block 722, the block movement in the direction of the selected willing module is executed. To do this, the modules 200 involved in the movement activate their respective item transporters 222.

In the illustrative embodiment, no movement of items 104 occurs until the interfering item negotiation 318 is complete. In other words, all of the subcomponents shown in FIG. 3 execute to determine the current condition of each of the modules 200 at a given time step, and then movement of all of the modules 200 occurs during the execute convey phase 320, based on the current condition of each of the modules 200. Thus, in the illustrative embodiment, at the end of the item seeking or east-west negotiation, all of the modules 200 in the grid 110 are committed to move left or right (if they are an interfering module), down (if they are a seeking module), or to remain idle (if they are occupied and not interfering).

In some embodiments, lateral movement of the items 104 in the grid 110 is temporary and restricted to one position away from the item's current position. Since, as a result of the entrance row logic, items 104 that are permitted to move laterally are ones that already have arrived at their target column, the lateral movement of such items is temporary and restricted so that the ordered sequence is preserved. Further, after a lateral move, a module 200 that has received a new item 104 from a lateral direction (e.g. left or right) detects that the item has a target column that is different (e.g., smaller or larger) than its own column number. As a result, such module 200 sends a request left or right message to the lateral neighboring module 200 having the same column number as the interfering item 104 moved by the lateral move (e.g., the module 200 from which the item 104 was received). Therefore, modules 200 that receive interfering items 104 initiate request messages to move the received items 104 back to their target positions in the next iteration. The buffer column described above is used during the interfering item negotiation to allow for lateral movements of items 104 even in rows of the grid 110 that have all of their modules 200 occupied.

In FIG. 8, a snapshot graphic of an exemplary grid 800 is shown. The grid 800 is an 11×11 grid with an entrance row 810, a buffer column 812, and a number of modules 814 (e.g., the smart transport modules 200), including an entrance module 816 and an exit module 818. The grid 800 is populated with a number of items 104, each of which is identified by an item ID 228 which is, in this case, a unique sequential number that corresponds to the item's target position according to the ordered sequence. During the illustrated time interval, items 44 and 60 are in the grid 800 and traveling downward to their target rows. Item 60 will ultimately travel to the bottom row.

Items 67 and 68 have been moved to the left to allow item 60 to pass by. Item 48 is moved to the left to allow the passage of item 44. Item 88 is traveling westward to its target column in the entrance row 810.

In FIG. 9, another snapshot graphic of the exemplary grid 800 is shown at a later point in time than the snapshot of FIG. 8. In FIG. 9, the modules 200 of the gird 800 are executing a "depart when column ready" departure policy. The items 104 in the first column of the grid 800 are leaving from the exit module 818. The items 41, 10, and 53 are still in transit to their target positions. In FIG. 9, it can be seen that the ordered sequence is nearly complete, whereas in FIG. 8, many of the items 104 are still out of sequence.

IMPLEMENTATION EXAMPLES

Aspects of the system 100 can resolve item sequencing problems in, among other applications, automated distribution systems, such as robotic and other mixed pallet building systems. Some aspects of the system 100 are applicable to, among other things, item handling and distribution environments that have both high throughput and high space utilization requirements. Aspects of the system 100 can be used in other applications as well, including sequencing outbound loads on a shipping dock for last-in, first-out delivery and sequencing parts and subassemblies in automotive manufacturing. The disclosed methods are applicable to very high-density grids that rely on "puzzle-based movement" of items in the grid, where the grid is made up of unit-sized conveyor modules. Further, embodiments of the system 100 can be implemented at different aspect ratios and multiple scales. For example, control of the modules 200 can be decentralized, which increases the scalability and reliability of the system 100.

Referring now to FIG. 10, a simplified block diagram of an exemplary environment 1000 in which aspects of the illustrative material handling system 100 may be implemented is shown. While the environment 1000 is shown as involving multiple components and devices, it should be understood that in some embodiments, the system 100 may constitute a single computing device, alone or in combination with other devices.

The illustrative material handling system 100 includes a computing device 1010, which may be in communication with one or more other computing systems or devices 1040 via one or more networks 1030. For example, in some embodiments, the computing devices 1010, 1040 embody the smart transport modules 200 in a decentralized, peer-based network. In other embodiments, the computing devices 1010, 1040 may represent a master-slave type architecture in which, for example, the computing device 1010 embodies a smart transport module 200 and the computing device 1040 embodies a master controller that controls the behavior of the smart transport module 200 and other modules 200 in the grid 110.

The illustrative computing device 1010 includes at least one processor 1012 (e.g. a microprocessor, microcontroller, digital signal processor, etc.), memory 1014, and an input/output (I/O) subsystem 1016. The computing device 1010 is embodied as a smart transport module 200 but may be embodied as any type of computing device such as a desktop, laptop, tablet, a server, enterprise computer system, a network of computers, a combination of computers and other electronic devices, or other electronic devices.

Although not specifically shown, it should be understood that the I/O subsystem 1016 typically includes, among other things, an I/O controller, a memory controller, and one or more I/O ports. The processor 1012 and the I/O subsystem 1016 are communicatively coupled to the memory 1014. The memory 1014 may be embodied as any type of suitable computer memory device (e.g., volatile memory such as various forms of random access memory).

The I/O subsystem 1016 is communicatively coupled to a number of hardware and/or software components and/or other computing systems including data storage 1018, a user interface subsystem 1020 (which may include, for example, one or more user input and output devices such as a touchscreen, keyboard, virtual keypad, microphone, speakers, displays, LEDs, etc.), and a communication subsystem 1022, in addition to an item detector 220A, STM control system 210A, and item transporter 220A. It should be understood that each of the foregoing components and/or systems may be integrated with the computing device 1010 or may be a separate component or system that is in communication with the I/O subsystem 1016 (e.g., over a network). For instance, the item transporter 220A may be embodied as a separate system.

The data storage 1018 may include one or more hard drives or other persistent data storage devices (e.g., flash memory, memory cards, memory sticks, and/or others). The ordered sequence 216A, rules and polices 218A, and current condition 220A constitute data elements that may be stored, at least temporarily, in the data storage 1018. In some embodiments, portions of systems software (e.g., an operating system, etc.), framework/middleware (e.g., application-programming interfaces, object libraries, etc.), The communication subsystem 1022 communicatively couples the computing device 1010 to the network 1030, which may be embodied as one or more networks, e.g., a local area network, wide area network, personal cloud, enterprise cloud, public cloud, and/or the Internet, for example. Accordingly, the communication subsystem 1022 may include one or more wired or wireless network interface software, hardware, or combination thereof, as may be needed pursuant to the specifications and/or design of the particular computing device 1010.

The computing device 1040 may be embodied as any suitable type of computing device such as any of the aforementioned types of devices or other electronic devices, in a similar manner as the computing device 1010. As such, components of the computing device 1040 having the same or similar names as the components of the computing device 101 are embodied similarly, and the description is not repeated here for brevity. Similarly, the components of the computing devices 1010, 1040 that correspond in name to components of the smart transport module 200 described above are embodied similarly, and therefore the description is not repeated here. In embodiments in which the computing devices 1010, 1040 represent two peer smart transport modules 200 of the grid 110, the components 210A, 216A, 218A, 222A, 224A represent the components of one of the smart transport modules 200 and the components 210B, 216B, 218B, 222B, 224B represent the components of the other of the smart transport modules 200. In master-slave type embodiments, the components 210A, 216A, 218A, 222A, 224A may represent local portions or copies of the system 100 while the components 210B, 216B, 218B, 222B, 224B may represent remote or server-based components of the system 100.

The computing system 1000 may include other components, sub-components, and devices not illustrated in FIG. 10 for clarity of the description. In general, the components of the computing system 1000 are communicatively coupled as shown in FIG. 10 by signal paths, which may be embodied as any type of wired or wireless signal paths capable of facilitating communication between the respective devices and components.

ADDITIONAL EXAMPLES

In at least one example, the present disclosure provides a method for arranging in an ordered sequence a number of physical items randomly presented to an automated material handling system having a plurality of programmable modules arranged in a grid, where each of the programmable modules can at least temporarily store one of the items at a time and transfer the stored item to an neighboring module in an automated fashion, and where the grid includes a plurality of rows in which items may travel bi-directionally and a plurality of columns in which items may travel bi-directionally. The method includes, with the programmable modules: admitting an item to the grid at a module of an entrance row of the grid; determining a current address of the module at which the item is currently located in the entrance row, the current address defined by a row identifier and a column identifier; determining a target address of a module at which the item is to be temporarily stored according to the ordered sequence, the target address defined by a row identifier and a column identifier; determining if the column identifier of the current address corresponds to the column identifier of the target address; if the column identifier of the current address does not correspond to the column identifier of the target address, activating a transport mechanism of one or more of the modules in the entrance row to move the item within the entrance row to the column of the target address; if the column identifier of the current address corresponds to the column identifier of the target address, determining if the row identifier of the current address corresponds to the row identifier of the target address, and if the row identifier of the current address does not correspond to the row of the target address, determining a new address, the new address having a column identifier that corresponds to the column of the current address and the new address being closer in proximity to the target address than the current address; and if another item is interfering with movement of the item to the new address, activating a transport mechanism of one or more of the modules in the row of the new address to temporarily move the interfering item to another module in the same row as the new address and activating a transport mechanism of one or more of the modules in the column of the new address to move the item to the new address.

The method may include, at each module of the entrance row, determining if the module is carrying an item and if the module is carrying an item, determining if the item is located at its target address. The method may include, by the module receiving the item admitted to the entrance row of the grid, initiating a message to another module in the entrance row to request movement of the item to another column in the entrance row. The method may include, by the module receiving the message, propagating the message to another module in the entrance row. The method may include, by the module receiving the message, sending a return message to the module receiving the item admitted to the entrance row of the grid, wherein the return message indicates that the module receiving the message can accommodate the movement of the item to another column in the entrance row. The method may include, in response to the return message, activating the transport mechanism of at least the module sending the return message and the module receiving the item admitted to the entrance row to move the item to another column of the entrance row that is closer to the column of the target address than the column of the current address. The method may include activating the transport mechanism of each of the modules between the module sending the return message and the module receiving the item admitted to the entrance row to move each of the items located in the entrance row to another column of the entrance row.

In at least one example, the present disclosure provides a system for arranging a number of randomly presented physical items in an ordered sequence to be handled by a robot, where the system includes programmable modules arranged in a grid, where each of the programmable modules can at least temporarily store one of the physical items, transfer the stored item to a neighboring module, and communicate messages to other modules in the grid. The system is to determine a target module at which the item is to be temporarily stored according to the ordered sequence, where the target module has an address defined by a row and a column; admit an item at a module of an entrance row of the grid, move the item within the entrance row to the column of the target module; move the item within the column of the target module to the row of the target module; and move an item that interferes with the moving of the item toward the target module from its target position to a buffer column of the grid, the buffer column operable to temporarily store items that interfere with the movement of the item traveling toward the target module.

The system may, by a module carrying the interfering item, initiate a message to other modules in the same row as the interfering item to request movement of the interfering item to the buffer column The system may, by an empty module in the buffer column in the same row as the interfering item, send a return message to the module carrying the interfering item indicating that the empty module can assist with the movement of the interfering item. The system may activate the transport mechanisms of at least the module carrying the interfering item and the empty module to move the interfering item to the empty module. The system may, in response to determining that the interfering item is no longer interfering with the movement of the item traveling toward the target module, activate the transport mechanisms of at least the empty module and the module carrying the interfering item to return the interfering item to its target position. The system may receive return messages from a plurality of empty modules in the same row as the module carrying the interfering item and select a first to respond empty module of the plurality of empty modules to assist with the movement of the interfering item. The system may initiate movement of the interfering item in the direction of the selected empty module.

In at least one example, the present disclosure provides a programmable module that includes a transport mechanism and a computer component embodying control logic to control the operation of the transport mechanism, where the transport mechanism operable to at least temporarily store a physical item and transfer the item to a neighboring module in a grid of programmable modules, the position of each of the programmable modules in the grid is defined by a row and a column, the computer component is operable to communicate messages to other modules in the grid, and the grid of programmable modules is operable to arrange a number of randomly presented items to exit the grid in an ordered sequence. The control logic of the programmable module is to determine a current condition of the programmable module as one of empty, occupied, or seeking, where empty indicates that the programmable module is not currently storing an item, occupied indicates that the programmable module is storing an item that is in a target position defined for the item in accordance with the ordered sequence, and seeking indicates that the programmable module is currently storing an item that has not reached its target position. The control logic is also to determine if the current condition of the programmable module satisfies a departure policy, where the departure policy is satisfied if (a) all modules in the same column as the programmable module and all modules in all columns between the column of the programmable module and an exit column from which items exit the grid, including the exit column, have a state of occupied or (b) all items to be sequenced are in the grid and at their target positions. The control logic is also to initiate a message to one or more neighboring modules in the same row or column as the programmable module to determine if the neighboring modules can receive an item currently stored by the programmable module, receive a message from the one or more neighboring modules in the same row or column as the programmable module, the message inquiring as to whether the programmable module can receive an item currently stored by the neighboring module; and update the current condition of the programmable module based on messages received from the neighboring modules.

In the programmable module, the control logic may send a message to a neighboring module in the same row as the programmable module, receive a response to the message from the neighboring module, and activate the transport mechanism of the programmable module in response to receiving the message from the neighboring module. In the programmable module, the control logic may receive a message from a neighboring module in the same column as the programmable module and activate the transport mechanism of the programmable module in response to receiving the message from the neighboring module. In the programmable module, the control logic may receive a message from a neighboring module in either the same row or the same column as the programmable module, in response to the message, determine if the programmable module is carrying an item, and if the programmable module is carrying an item, propagate the message to a neighboring module other than the neighboring module from which the message was received. In the programmable module, the control logic may receive a message from a neighboring module in either the same row or the same column as the programmable module, in response to the message, determine if the programmable module is carrying an item, and if the programmable module is not carrying an item, send a return message to the neighboring module from which the message was received. In the programmable module, the control logic may operate an item detector of the programmable module to determine the current condition of the programmable module, wherein the item detector comprises a sensing device, determine if the current condition satisfies the departure policy, and activate the transport mechanism of the programmable module if the current condition satisfies the departure policy.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for arranging in an ordered sequence a number of physical items randomly presented to an automated material handling system having a plurality of programmable modules arranged in a grid, each of the programmable modules configured to at least temporarily store one of the items at a time and transfer the stored item to an neighboring module in an automated fashion, the grid comprising a plurality of rows in which items may travel bi-directionally and a plurality of columns in which items may travel bi-directionally, the method comprising, with the programmable modules:

admitting an item to the grid at a module of an entrance row of the grid;

determining a current address of the module at which the item is currently located in the entrance row, the current address defined by a row identifier and a column identifier;

determining a target address of a module at which the item is to be temporarily stored according to the ordered sequence, the target address defined by a row identifier and a column identifier;

determining if the column identifier of the current address corresponds to the column identifier of the target address;

if the column identifier of the current address does not correspond to the column identifier of the target address, activating a transport mechanism of one or more of the modules in the entrance row to move the item within the entrance row to the column of the target address;

if the column identifier of the current address corresponds to the column identifier of the target address, determining if the row identifier of the current address corresponds to the row identifier of the target address, and if the row identifier of the current address does not correspond to the row of the target address, determining a new address, the new address having a column identifier that corresponds to the column of the current address and the new address being closer in proximity to the target address than the current address; and if another item is interfering with movement of the item to the new address, activating a transport mechanism of one or more of the modules in the row of the new address to temporarily move the interfering item to another module in the same row as the new address and activating a transport mechanism of one or more of the modules in the column of the new address to move the item to the new address.

2. The method of claim 1, comprising, at each module of the entrance row, determining if the module is carrying an item and if the module is carrying an item, determining if the item is located at its target address.

3. The method of claim 1, comprising, by the module receiving the item admitted to the entrance row of the grid, initiating a message to another module in the entrance row to request movement of the item to another column in the entrance row.

4. The method of claim 3, comprising, by the module receiving the message, propagating the message to another module in the entrance row.

5. The method of claim 3, comprising, by the module receiving the message, sending a return message to the module receiving the item admitted to the entrance row of the grid, wherein the return message indicates that the module receiving the message can accommodate the movement of the item to another column in the entrance row.

6. The method of claim 5, comprising, in response to the return message, activating the transport mechanism of at least the module sending the return message and the module receiving the item admitted to the entrance row to move the item to another column of the entrance row that is closer to the column of the target address than the column of the current address.

7. The method of claim 5, comprising activating the transport mechanism of each of the modules between the module sending the return message and the module receiving the item admitted to the entrance row to move each of the items located in the entrance row to another column of the entrance row.

8. A system for arranging a number of randomly presented physical items in an ordered sequence to be handled by a robot, the system comprising a plurality of programmable modules arranged in a grid, each of the programmable modules operable to at least temporarily store one of the physical items, transfer the stored item to a neighboring module, and communicate messages to other modules in the grid, the system to:

determine a target module at which the item is to be temporarily stored according to the ordered sequence, the target module having an address defined by a row and a column;

admit an item at a module of an entrance row of the grid, move the item within the entrance row to the column of the target module;

move the item within the column of the target module to the row of the target module; and move an item that interferes with the moving of the item toward the target module from its target position to a buffer column of the grid, the buffer column operable to temporarily store items that interfere with the movement of the item traveling toward the target module.

9. The system of claim 8, to, by a module carrying the interfering item, initiate a message to other modules in the same row as the interfering item to request movement of the interfering item to the buffer column.

10. The system of claim 9, to, by an empty module in the buffer column in the same row as the interfering item, send a return message to the module carrying the interfering item indicating that the empty module can assist with the movement of the interfering item.

11. The system of claim 10, to activate the transport mechanisms of at least the module carrying the interfering item and the empty module to move the interfering item to the empty module.

12. The system of claim 11, to, in response to determining that the interfering item is no longer interfering with the movement of the item traveling toward the target module, activate the transport mechanisms of at least the empty module and the module carrying the interfering item to return the interfering item to its target position.

13. The system of claim 9, to receive return messages from a plurality of empty modules in the same row as the module carrying the interfering item and select a first to respond empty module of the plurality of empty modules to assist with the movement of the interfering item.

14. The system of claim 13, to initiate movement of the interfering item in the direction of the selected empty module.

15. A programmable module comprising a transport mechanism and a computer component embodying control logic to control the operation of the transport mechanism, the transport mechanism operable to at least temporarily store a physical item and transfer the item to a neighboring module in a grid of programmable modules, the position of each of the programmable modules in the grid defined by a row and a column, the computer component operable to communicate messages to other modules in the grid, the grid of programmable modules operable to arrange a number of randomly presented items to exit the grid in an ordered sequence, the control logic of the programmable module to:

determine a current condition of the programmable module as one of empty, occupied, or seeking, wherein empty indicates that the programmable module is not currently storing an item, occupied indicates that the programmable module is storing an item that is in a target position defined for the item in accordance with the ordered sequence, and seeking indicates that the programmable module is currently storing an item that has not reached its target position;

determine if the current condition of the programmable module satisfies a departure policy, wherein the departure policy is satisfied if (a) all modules in the same column as the programmable module and all modules in all columns between the column of the programmable module and an exit column from which items exit the grid, including the exit column, have a state of occupied or (b) all items to be sequenced are in the grid and at their target positions;

initiate a message to one or more neighboring modules in the same row or column as the programmable module to determine if the neighboring modules can receive an item currently stored by the programmable module;

receive a message from the one or more neighboring modules in the same row or column as the programmable module, the message inquiring as to whether the programmable module can receive an item currently stored by the neighboring module; and update the current condition of the programmable module based on messages received from the neighboring modules.

16. The programmable module of claim 15, wherein the control logic is to send a message to a neighboring module in the same row as the programmable module, receive a response to the message from the neighboring module, and activate the transport mechanism of the programmable module in response to receiving the message from the neighboring module.

17. The programmable module of claim 15, wherein the control logic is to receive a message from a neighboring module in the same column as the programmable module and activate the transport mechanism of the programmable module in response to receiving the message from the neighboring module.

18. The programmable module of claim 15, wherein the control logic is to receive a message from a neighboring module in either the same row or the same column as the programmable module, in response to the message, determine if the programmable module is carrying an item, and if the programmable module is carrying an item, propagate the message to a neighboring module other than the neighboring module from which the message was received.

19. The programmable module of claim 15, wherein the control logic is to receive a message from a neighboring module in either the same row or the same column as the programmable module, in response to the message, determine if the programmable module is carrying an item, and if the programmable module is not carrying an item, send a return message to the neighboring module from which the message was received.

20. The programmable module of claim 15, wherein the control logic is to operate an item detector of the programmable module to determine the current condition of the programmable module, wherein the item detector comprises a sensing device, determine if the current condition satisfies the departure policy, and activate the transport mechanism of the programmable module if the current condition satisfies the departure policy.

* * * * *